United States Patent [19]

Jankowiak

[11] 4,071,400

[45] Jan. 31, 1978

[54] METHOD FOR CONTROLLING SOIL EROSION

[75] Inventor: Erwin M. Jankowiak, Sanford, Mich.

[73] Assignee: The Dow Chemical Company, Midland, Mich.

[21] Appl. No.: 673,571

[22] Filed: Apr. 5, 1976

[51] Int. Cl.$^2$ .............................................. D21D 3/00
[52] U.S. Cl. ........................................ 162/169; 47/9;
162/177; 264/122; 260/17.4 BB; 260/17.4 R;
526/200; 526/317
[58] Field of Search .............................. 526/317, 200;
260/17.4 BB, 17.4 R, 29.7 R, 29.7 EM;
162/169, 150, 177; 264/128, 122; 47/9

[56] References Cited

U.S. PATENT DOCUMENTS

| 3,838,086 | 9/1974 | Schnoring et al. .......... 260/29.7 EM |
| 3,867,250 | 2/1975 | Jankowiak et al. .................. 526/200 |

*Primary Examiner*—Robert L. Lindsay, Jr.
*Assistant Examiner*—Peter Chin
*Attorney, Agent, or Firm*—Albin R. Lindstrom

[57] ABSTRACT

Erosion of soil is inhibited by forming a wind and rain resistant mat thereon by the method whereby a water soluble cellulose ether is dispersed in a latex containing at least 2.0 percent solids of an interpolymer of an alkenyl aromatic monomer, a conjugated diolefin and an unsaturated carboxylic acid and an organo sulfonate; the composition diluted, plant fibers dispersed therein and the so formed dispersion deposited on the soil in the form of a covering layer.

6 Claims, No Drawings

METHOD FOR CONTROLLING SOIL EROSION

BACKGROUND OF THE INVENTION

Soil erosion is a phenomenon occurring in a wide variety of situations. It is accelerated by the action of wind and of rain and is especially bad in conditions of poor soil coherence. The loose surface is scoffed by the wind and seeds of plants that might otherwise germinate to provide a root system to hold the soil in place are disturbed. In like fashion streams of water formed in rain storms on less pervious soils carry away the surface.

In the making of cuttings, enbankments, or culverts during highway construction, large areas of steeply sloping bare soil are exposed to the weather. The construction engineer has commonly distributed a layer of straw over the surface. However, that is susceptible to loss by wind. More recently asphalt emulsions have been applied to the straw layer to hold the stalks in place. Those emulsions are undesirable because of application difficulties such as a need for heat source, plugging of the application equipment and creating a major clean-up problem.

The straw serves another function as an insulator to protect newly emerging grasses from frost when the seeding is done in the spring or late fall. Also, straw is available in the near vicinity of where needed.

Wood fibers are also used commercially to control soil erosion. They are hydraulically and directly applied onto soil from a complete "seeding slurry" or "hydromulch", which contains seeds, fertilizer and occasionally lime, in addition to wood fiber. The resulting protective mat containing seed and fertilizer is said to be sufficiently durable to withstand wind and rain exposure. In general practice however, this is not the case, since polymeric binders are almost always used to assure durable weatherability.

At a typical recommended rate of 1000–1500 lb. wood fiber per acre, 50 gal. of polymeric binder per acre and an overall applied rate of 2500 gal./acre, binder concentrations are generally less than about 1.5% based on water. These high dilutions are necessary for controlled distribution of such large quantities of wood fiber onto soil surfaces. Because of such low binder solids concentrations in the water phase, it is important to transfer them as completely as possible, into the fiber network for maximum efficiency. Failure to accomplish this results in significant loss of binder solids to the soil, thereby producing a low strength protective mat.

The Prior Art

Randomly distributed straw has been used for a long time as a mulch. Likewise, asphalt emulsions have been used to adhere straw stalks into mats.

Soil erosion control using solutions or dispersions of polymeric materials is the subject of numerous patents. Such techniques require the use of relatively large amounts of polymer all of which usually must be transported long distances to the application site.

In U.S. Pat. No. 3,867,250 it is taught that mats of straw can be made wind and water resistant by binding the stalks together with an interpolymer of an alkenyl aromatic monomer, a diolefin and an unsaturated carboxylic acid with an organo sulfonate and a cellulose ether.

SUMMARY OF THE INVENTION

The present invention is directed to an improved method for making a mat or covering layer on exposed soil from plant fibers and coalesced latex particles.

Wood fibers display an "affinity" for coalesced, agglomerated or coagulated latex particles. Under normal vigorous hydroseeder agitation which is required to maintain homogeneity, these fibers "scrub-out" the larger polymer agglomerates and collect them in and amongst their intertwining fiber network. This does not occur with unmodified pure latex.

The water resistant adhesive consists essentially of an aqueous polymer latex, a water soluble cellulose ether and an organo sulfonate.

The concept of this invention involves mixing a cellulose ether with the formulated latex having at least 2.0 weight percent polymer solids and then diluting the so formed composition to the predetermined dilution level usually of about 1.0 weight percent or less. Preferably the solids will not exceed about 25 weight percent during the mixing. Above that percentage of solids, the polymer coagulates as large agglomerates which are of no use in bonding the fibers together and which are not dilutable.

The useful latexes are those of interpolymers of an alkenyl aromatic monomer, an open chain aliphatic conjugated diene and an unsaturated carboxylic monomer.

By the term, alkenyl mononuclear aromatic monomer, it is intended to include those monomers wherein an alkenyl group is attached directly to an aromatic nucleus containing from 6 to 10 carbon atoms. Those monomers are intended to include alkyl- or halo-substituted compounds. Typical of these monomers are styrene, orthometa-, and para-methylstyrene, ortho-, meta-, and para-ethylstyrene, ortho, paradimethylstyrene, ortho, para-diethylstyrene, para-chlorostyrene, isopropylstyrene, ortho-methyl-paraisopropylstyrene, ortho-para-dichlorostyrene, vinylnaphthalene, and diverse vinyl (alkylnaphthalenes and vinyl(halonaphthalenes). The term is also intended to include comonomeric mixtures of styrene with α-methylstyrene or one of the above-named alkenyl mononuclear aromatic monomers. Because of their availability and their ability to produce desirable polymers and for other reasons, it is preferred to use styrene or vinyl toluene as the monovinyl aromatic monomer.

By the term, open-chain aliphatic conjugated diene having from 4 to about 9 carbon atoms, it is meant to include, typically, butadiene-1,3; 2-methyl-butadiene-1,3; 2,3-dimethylbutadiene-1,3; piperylene; 2-neopentyl-butadiene-1,3; and other hydrocarbon homologs of butadiene-1,3, and, in addition, the substituted dienes, such as 2-chlorobutadiene-1,3; 2-cyanobutadiene-1,3; the substituted straight chain conjugated pentadiene, the straight and branch chain hexadiene, and others having from 4 to about 9 carbon atoms. The butadiene-1,3 hydrocarbons, because of their ability to produce particularly desirable polymeric materials, are especially advantageous. Butadiene-1,3 which is inexpensive, readily available, and produces interpolymers having excellent properties is preferred.

The monoethylenically unsaturated acid derivative may be selected from a wide variety of compounds, such as carboxylic acids, and anhydrides. It is imperative that the acid derivative be copolymerizable with the other monomers and that it be an acid or hydrolyzable to an acid. Typical examples of these derivatives are itaconic acid, acrylic acid, vinyl sulfonic acid, vinyl benzoic acid, and isopropentyl benzoic acid. Mixtures of two or more such monoethyleneically unsaturated acid derivatives may be used if desired.

The diolefin should constitute from at least 40 percent by weight of the total weight of monomers used. The alkenyl aromatic monomer should constitute less than 60 percent by weight of the total weight of monomers and the monoethylenically unsaturated-acid derivative should be present in amounts from 2 to 10 percent by weight of the total weight of monomers. Polymers having compositions outside of the above stated limits generally have one or more undesirable properties which make them unsuitable for use in the instant invention.

The latexes may be prepared by known procedures for polymerization in aqueous emulsion. Typically, the monomers are dispersed in an aqueous solution of from about 0.05 to 5 percent of a polymerization catalyst, such as potassium persulfate and from about 0.05 to 5 percent of a pH stable surface-active agent capable of emulsifying the monomers. Many such surface-active agents are known. Polymerization is initiated by heating the emulsified mixture usually between 30° to 70° C and is continued by maintaining the polymerizing emulsion at the selected temperature. After the polymerization has reached the desired conversion of monomer to polymer, the latex is filtered to remove any precoagulum and may be stabilized to storage by the addition of a small amount of known stabilizer.

Most latexes as sold commercially have from about 30 to 50 weight percent polymeric solids. The latexes may be used at that solids concentration, but are difficult to spread over a straw mulch. It is advantageous to dilute the latexes to from about 5 to 10 percent solids so they can be pumped and spread easily.

The water resistant adhesive also includes a water soluble cellulose ether. Representative of the useful cellulose ethers are methyl cellulose and the hydroxalkyl methyl celluloses where the hydroxyalkyl group contains from 2 to 4 carbon atoms. A preferred class of such ethers includes those hydroxypropyl methyl cellulose ethers having from 0.4 to 1.3 methoxyl substitution and from 0.2 to 1.4 hydroxypropoxy substitution with a total substitution of at least 1.0. Such cellulose ethers are commercially available in various viscosity grades. A cellulose ether with a viscosity in 2 percent aqueous solution of from about 50 to about 100 Krebs units measured at 20° C is especially suitable for use herein although higher or lower viscosities may also provide advantages to the adhesive.

The organo sulfonates are water soluble compounds having at least one sulfonate group attached to an aromatic ring and may be represented by the formula:

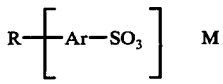

wherein R is alkyl having from about 8 to 20 carbon atoms, an alkenyl chain having from about 8 to 20 carbon atoms and combinations of said chains with ethoxy chains, phenyl, phenoxy, and alkyl or alkoxy substituted phenyl or phenoxy; Ar is phenyl or naphthyl and M is an alkali metal or ammonia.

An advantageous class of organo sulfonates is represented by the formula:

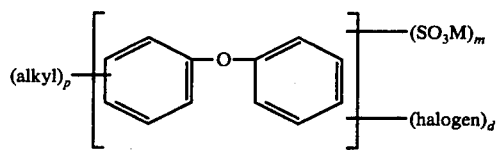

wherein "alkyl" represents an alkyl radical having from 8 to 18 carbon atoms, $p$ is an integer from 1 to 2; halogen represents chlorine or bromine, $d$ represents an integer from 0 to 1, M represents an alkali or alkaline earth metal, and $m$ represents an integer from 1 to 3. Thus, there is included the alkali metal alkylated phenyl ether sulfonates having from 8 to 18 carbon atoms in the alkyl chain, the alkali metal dialkylated phenyl ether sulfonates, the alkali metal alkylated phenyl ether, disulfonates, the alkali metal dialkylated phenyl ether disulfonates, and their chloro and bromo derivatives, and the like, and the alkaline earth alkylated phenyl ether sulfonates, the alkaline earth dialkylated phenyl ether sulfonates, the alkaline earth alkylated phenyl ether disulfonates, and the like.

A preferred organo sulfonate is dodecyl phenyl ether sulfonate sodium salt.

The proportions of the components may be varied within rather wide limits while retaining the adhesivity as well as the water resistance. The cellulose ether should be present in an amount of at least about 0.5 weight percent based on the weight of the polymer. Preferably the cellulose ether should be from about 1.0 to about 2.5 weight percent. The organo sulfonate should be present in sufficient amount to attain a water resistant film but not so much as to destroy the water resistance. Generally that amount will be in the range of about 0.7 to about 2.5 weight percent based on the weight of the polymer.

The amount of plant fibers to be used may also be varied within wide limits depending upon the severity of the exposure, the capability of the equipment to disperse the fibers and to discharge the fibers onto the desired locus and other known factors. Generally from about 500 to 2000 pounds of fiber per acre will suffice. An amount of 1000 to 1500 pounds of fiber per acre is preferred. The maximum amount to be used will be dictated by the requirement that the fiber/binder composition be dispersible into the form of a mat. The minimum amount will be that required to form a mat of the desired coverage.

The fibers may be added to the latex before or after the cellulose ether. As a general rule, however, the fibers will be added after the cellulose ether because of the difficulty of achieving thorough mixing of the cellulose ether in a fiber/latex dispersion having insufficient water.

The so-formed mats are highly effective in minimizing wind and rain erosion of loose soil. The method results in mats requiring less polymer solids than those made with non-coalesced particles of latexes. The method of their preparation presents many ecological advantages over prior used asphalic emulsions.

The method is illustrated in the following examples which are intended only to exemplify and not to limit the scope of the invention.

EXAMPLE 1

A latex was diluted to various levels to determine the effect of dilution on its coalescence properties. The latex used was of an interpolymer of 48.0 weight percent styrene, 50.0 weight percent butadiene, and 2.0 weight percent itaconic acid. The latex contained 1.5 weight percent based on latex solids of a mixture of sodium dodecyl phenoxy benzene sulfonates consisting of about 75 percent monoalkylated and 25 percent dialkylated products.

After dilution to each sample was added one weight percent, based on the solids, of a hydroxypropyl methyl cellulose having a viscosity of 75 Krebs units and prepared according to U.S. Pat. No. 3,388,082.

The dilutions were made by adding the required amount of latex to give the desired percent solids to 100 grams of water. The cellulose was mixed in and the formulations poured immediately into glass tubes maintained vertically. The tubes were stoppered and observed for settling of solids and for the nature of the supernatant liquid. The results are shown in Table I.

Table I

| Sample | Percent Solids | Grams Latex | Grams Cellulose Ether | Coalescense | Supernatant Liquid |
| --- | --- | --- | --- | --- | --- |
| 1 | 25 | 55.5 | 0.25 | Good | Clear |
| 2 | 20 | 44.4 | 0.20 | Good | Clear |
| 3 | 15 | 33.3 | 0.15 | Good | Clear |
| 4 | 10 | 22.2 | 0.10 | Good | Clear |
| 5 | 7.5 | 16.6 | 0.075 | Good | Clear |
| 6 | 5.0 | 11.1 | 0.05 | Some | Cloudy |
| 7 | 2.5 | 5.55 | 0.025 | Some | Cloudy |
| 8 | 1.0 | 2.22 | 0.01 | None observable | Opaque latex |
| 9 | 0.5 | 1.11 | 0.005 | None observable | Opaque latex |

EXAMPLE 2

Diluted samples of the latex of Example 1 were prepared in 8 ounce bottles according to that procedure. To each sample there was added 5.5 grams of wood fibers dyed green and solid as Conwed Hydro Mulch by the Conwed Corporation. Each sample contained 0.379 percent solids based on the water. The samples were stirred on a lab stirrer for 10 minutes and the appearance of the fiber mass observed. With thorough mixing the appearance was that of a green fibrous mass not unlike the appearance of the fibers dispersed in water. The supernatant liquid was clear. In these instances the fibers were said to have scrubbed the solids completely or to show good scrubbing. With the non-coalesced latexes the appearance showed considerable white non scrubbed latex and the supernatant liquid was opaque and latex like.

When so tested the samples that were diluted to 0.379% solids from the latexes having 2.5 to 25 percent solids showed good scrubbing whereas the samples that were diluted to 0.379% solids latexes 0.5 and 1.0 percent solids had no observable scrubbing.

What is claimed is:

1. In a method for making a wind and rain resistant mat comprising the blending of plant fibers with at least 75 pounds per ton of fibers of a water resistant adhesive, consisting essentially of (1) an interpolymer of less than 60 weight percent of an alkenyl aromatic monomer wherein an alkenyl group is attached directly to an aromatic nucleus, at least 40 weight percent of an open chain conjugated diolefin having from 4 to about 9 carbon atoms, and an unsaturated carboxylic acid or anhydride (2) from about 0.5 to 2.5 weight percent based on polymer solids of a water soluble cellulose ether and (3) from about 0.70 to 2.5 weight percent of a water-soluble organo sulfonate having at least one sulfonate group attached to an aromatic ring and represented by the formula:

$$R[Ar-SO_3]M$$

wherein R is an alkyl chain having from about 8 to 20 carbon atoms, an alkenyl chain having from about 8 to 20 carbon atoms and combinations of said chains with ethoxy chains, phenyl, phenoxy, and alkyl or alkoxy substituted phenyl or phenoxy:

Ar is phenyl or naphthyl and M is an alkali metal or ammonia; distributing the coated fibers randomly into a layer, and drying the adhesive, the improvement comprising mixing said cellulose ether with the latex containing from about 2.0 to about 25 weight percent polymer solids and then diluting the composition to the predetermined dilution level of less than about 1.0 weight percent total solids and adding the desired amount of plant fibers.

2. The method of claim 1 wherein said plant fibers are wood fibers.

3. The method of claim 1 wherein said interpolymer is composed of styrene, butadiene, acrylic acid and maleic anhydride.

4. The method of claim 3 wherein said interpolymer is composed of about 36.5 weight percent styrene, about 60 weight percent butadiene, about 2 weight percent acrylic acid and about 1.5 weight percent maleic anhydride.

5. The method of claim 1 wherein said water soluble cellulose ether is hydroxypropyl methyl cellulose.

6. The method of claim 1 wherein said organo sulfonate is sodium dodecylphenoxy benzene sulfonate.

* * * * *